United States Patent
Sigler

(10) Patent No.: US 9,747,314 B2
(45) Date of Patent: Aug. 29, 2017

(54) NORMALIZED SEARCHABLE CLOUD LAYER

(71) Applicant: Rackspace US, Inc., San Antonio, TX (US)

(72) Inventor: Egle Sigler, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 161 days.

(21) Appl. No.: 13/950,989

(22) Filed: Jul. 25, 2013

(65) Prior Publication Data

US 2015/0032756 A1    Jan. 29, 2015

(51) Int. Cl.
  *G06F 17/30* (2006.01)
(52) U.S. Cl.
  CPC .............. *G06F 17/30321* (2013.01)
(58) Field of Classification Search
  CPC ............. G06F 17/30864; G06F 17/30321
  USPC ........................................... 707/741
  See application file for complete search history.

(56) References Cited

U.S. PATENT DOCUMENTS

| | | | |
|---|---|---|---|
| 7,890,938 B2* | 2/2011 | Jensen et al. | 717/143 |
| 2003/0101173 A1* | 5/2003 | Lanzatella et al. | 707/4 |
| 2006/0149767 A1* | 7/2006 | Kindsvogel et al. | 707/101 |
| 2010/0082774 A1* | 4/2010 | Pitts | G06F 17/30144 709/219 |
| 2010/0293335 A1* | 11/2010 | Muthiah et al. | 711/133 |
| 2011/0119652 A1* | 5/2011 | Yu et al. | 717/108 |
| 2011/0145814 A1* | 6/2011 | Mangione-Smith | 718/1 |
| 2012/0303807 A1* | 11/2012 | Akelbein et al. | 709/224 |
| 2012/0311111 A1* | 12/2012 | Frew et al. | 709/221 |
| 2013/0054426 A1* | 2/2013 | Rowland et al. | 705/27.2 |
| 2013/0291121 A1* | 10/2013 | Iovanov | G06F 9/541 726/28 |

OTHER PUBLICATIONS

Canonicalization—Wikipedia, The Free Encyclopedia; "Canonicalization;" Mar. 7, 2013; pp. 1-3; http://en.wikipedia.org/wiki/Canonicalization.

* cited by examiner

*Primary Examiner* — Kris Mackes
*Assistant Examiner* — Allen Lin
(74) *Attorney, Agent, or Firm* — Dykema Gossett P.L.L.C.

(57) ABSTRACT

An example system for indexing heterogeneous resources includes a data module that invokes one or more APIs, and responsive to the invoked one or more APIs, receives a first set of attributes of one or more cloud resources of a first subset of the set of cloud resources and a second set of attributes of one or more cloud resources of a second subset of the set of cloud resources. The system also includes a normalization module that for at least one attribute of the first and second sets of attributes, searches a database for a normalized attribute corresponding to the respective one attribute, normalizes based on the uniform schema the respective attribute, and places the normalized attribute in a data structure. The system further includes an indexing module that indexes the normalized attributes in the data structure.

13 Claims, 9 Drawing Sheets

300

```
{
  "faultTolerant": false,
  "cpuCount": 1,
  "toolStatus": "Not installed",
  "location": "DFW",
  "isClone": false,
  "network": ["BackupNet", "ExNet"],
  "cpuAllocation": 0,
  "id": "rhel6_64Guest",
  "timestamp": 1342107046532,
  "accountNumber": "862323",
  "mountPoints": [],
  "deviceType": "vm",
  "name": "435534-417834-linrepl.repl.com",         ── 306
  "datacenterIp": "10.7.30.9",
  "datastores": [{
    "id": "datastore-5649",
    "availableSpace": 369524893286,
    "extent": "naa.600601604d911c00905fb826dc62e111",
    "name": "168720-san-sata-hlul",
    "capacity": 643976658944,
    "displayName": "DGC Fibre Channel Disk (naa.600601604d911c00905fb826dc62e111)",
    "type": "VMFS",
    "freespace": 466121392128,
    "url": "sanfs://vmfs_uuid:4f4e94c3-ad2437c6-b1a4-001517b8f27d/"
  }],

302 

```
...
"diskInfo": [{
   "parentDatastoreMOR": "datastore-5649",
   "name": "Hard disk 1",
   "capacity": 15728640
}],
"poweredOn": false,
"parentUuid": "34313431-3039-5553-4537-31344e415238",
"status": "unknown",
"parent": 0,
"datacenterName": "vs00.dfw.rvi.local",
"powerStatus": "off",
"availableNetworks": ["ExNet"],
"isReal": true,
"memoryAllocation": 1024,
"isTemplate": false,
"memoryCount": 0,
"uuid": "421f465c-5162-4e1e-bdc7-7b6d173800f1",
"deviceNumber": 435534,
"guestOS": "Red Hat Enterprise Linux 6 (64-bit)"
}
```

FIG. 3B

NORMALIZED SEARCHABLE CLOUD LAYER

BACKGROUND

The present disclosure relates generally to a cloud environment, and more particularly to managing resources in the cloud environment.

Cloud computing services can provide computational capacity, data access, networking/routing and storage services via a large pool of shared resources operated by a cloud computing provider. Because the computing resources are delivered over a network, cloud computing is location-independent computing, with resources being provided to end-users on demand with control of the physical resources separated from control of the computing resources.

Originally the term cloud came from a diagram that contained a cloud-like shape to contain the services that afforded computing power that was harnessed to get work done. Much like the electrical power we receive each day, cloud computing is a model for enabling access to a shared collection of computing resources—networks for transfer, servers for storage, and applications or services for completing work. More specifically, the term "cloud computing" describes a consumption and delivery model for information technology (IT) services based on the Internet, and it typically involves over-the-Internet provisioning of dynamically scalable and often virtualized resources. This frequently takes the form of web-based tools or applications that a user can access and use through a web browser as if it were a program installed locally on the user's own computer. Details are abstracted from consumers, who no longer have a need for expertise in, or control over, the technology infrastructure "in the cloud" that supports them. Cloud computing infrastructures may include services delivered through common centers and built on servers. Clouds may appear as single points of access for consumers' computing needs, and may not require end-user knowledge of the physical location and configuration of the system that delivers the services.

The cloud computing utility model is useful because many of the computers in place in data centers today are underutilized in computing power and networking bandwidth. A user may briefly need a large amount of computing capacity to complete a computation for example, but may not need the computing power once the computation is done. The cloud computing utility model provides computing resources on an on-demand basis with the flexibility to bring the resources up or down through automation or with little intervention.

SUMMARY

According to an embodiment, a system for indexing heterogeneous resources includes a database including a set of mappings from an attribute of a cloud resource specific to a cloud to a normalized attribute based on a uniform schema. The system also includes one or more servers coupled to the database and configured to execute computer program modules. The computer program modules include a data module, normalization module, and indexing module, each module being executable by the one or more servers. The data module identifies a set of cloud resources in a plurality of virtual datacenters, invokes one or more application programming interfaces (APIs), and responsive to the invoked one or more APIs, receives a first set of attributes of one or more cloud resources of a first subset of the set of cloud resources and a second set of attributes of one or more cloud resources of a second subset of the set of cloud resources. The first subset of cloud resources is executable in the first cloud, and the second subset of cloud resources is executable in the second cloud. The first set of attributes is compatible with the first cloud and incompatible with the second cloud, and the second set of attributes is compatible with the second cloud and incompatible with the first cloud. For at least one attribute of the first and second sets of attributes, the normalization module searches the database for a normalized attribute corresponding to the respective attribute, normalizes based on the uniform schema the respective attribute, and places the normalized respective attribute in a data structure. The indexing module indexes the one or more normalized attributes in the data structure.

According to another embodiment, a method of indexing heterogeneous resources includes identifying a set of cloud resources in a plurality of virtual datacenters. The method also includes invoking one or more application programming interfaces (APIs). The method further includes responsive to the one or more invoked APIs, receiving a first set of attributes of one or more cloud resources of a first subset of the set of cloud resources and a second set of attributes of one or more cloud resources of a second subset of the set of cloud resources. The first subset of cloud resources is executable in the first cloud, and the second subset of cloud resources is executable in the second cloud. The first set of attributes is compatible with the first cloud and incompatible with the second cloud, and the second set of attributes is compatible with the second cloud and incompatible with the first cloud. The method also includes for at least one attribute of the first and second sets of attributes, searching a database for a normalized attribute corresponding to the respective attribute, normalizing based on a uniform schema the respective attribute, and placing the respective normalized attribute in a data structure. The database includes a set of mappings from an attribute of a cloud resource specific to a cloud to a normalized attribute based on a uniform schema. The method further includes indexing the one or more normalized attributes in the data structure.

According to another embodiment, the indexing system includes a non-transient computer readable medium containing executable instructions that when executed on a processor perform a method including: identifying a set of cloud resources in a plurality of virtual datacenters; invoking one or more application programming interfaces (APIs); responsive to the invoking one or more APIs, receiving a first set of attributes of one or more cloud resources of a first subset of the set of cloud resources and a second set of attributes of one or more cloud resources of a second subset of the set of cloud resources, where the first subset of cloud resources is executable in the first cloud, and the second subset of cloud resources is executable in the second cloud, and where the first set of attributes is compatible with the first cloud and incompatible with the second cloud, and the second set of attributes is compatible with the second cloud and incompatible with the first cloud; for at least one attribute of the first and second sets of attributes: searching a database for a normalized attribute corresponding to the respective attribute, the database including a set of mappings from an attribute of a cloud resource specific to a cloud to a normalized attribute based on a uniform schema; normalizing based on the uniform schema the respective attribute; and placing the normalized at least one attribute in a data structure; and indexing the one or more normalized attributes in the data structure.

BRIEF DESCRIPTION OF THE DRAWINGS

FIGS. 3A and 3B illustrate a JSON formatted document for a virtual machine, according to an embodiment.

DETAILED DESCRIPTION

I. Overview
II. Example System Architecture
  A. Cloud Resources
  B. Normalize the Attributes
  C. Physical Resources
  D. Index the Attributes
  E. Update the Attributes
III. Different Cloud Deployments
IV. Example Methods
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A cloud computing environment may include cloud resources and physical resources. The cloud resources and physical resources may be resources from one or more physical datacenters. This disclosure provides techniques to provide quick access to the resources.

Figure 1:
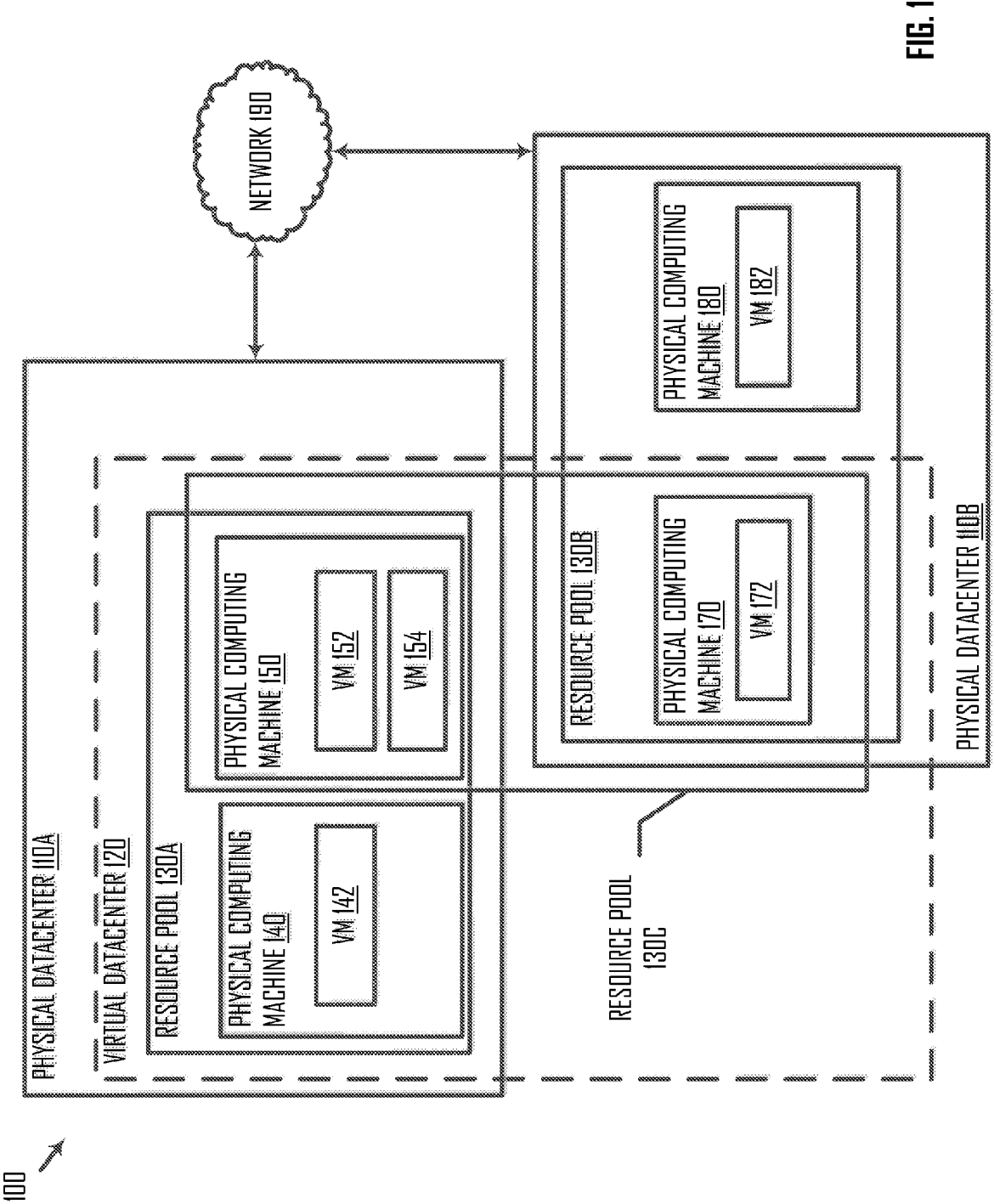
FIG. 1 is a simplified block diagram illustrating physical datacenters, according to an embodiment.

FIG. 1 is a simplified block diagram 100 illustrating physical datacenters, according to an embodiment.

Diagram 100 includes physical datacenters 110A and 110B. Each of the physical datacenters may be located at any geographic location. In an example, physical datacenter 110A is located in San Antonio, Tex., and physical datacenter 110B is located in New Delhi, India. The physical datacenter may include resources associated with one or more virtual datacenters. In an example, physical datacenters 110A and 110B include resources associated with virtual datacenter 120. In particular, virtual datacenter 120 includes resources located in physical datacenters 110A and 110B.

A resource may be a physical resource or a cloud resource. The physical resource may be, for example, a physical computing machine, hypervisor executing in the physical computing machine, network, memory, or disk storage. The cloud resource may be, for example, a logical resource such as a VM, cluster, virtual network, virtual storage, clone, template, snapshot, or performance metrics.

The virtual datacenter may include resources associated with one or more resource pools. A resource pool may include one or more clusters, hypervisors, virtual machines, networks, storage, clones, templates, snapshots, and performance metrics. Virtual datacenter 120 includes resources associated with resource pools 130A, 130B, and 130C. Resource pool 130A includes resources located in physical datacenter 110A, resource pool 130B includes resources located in physical datacenter 110B, and resource pool 130C includes resources located in physical datacenters 110A and 110B.

Control and utilization of these resources may be abstracted at multiple levels through various components of the cloud computing environment. The resource pool may span multiple virtual datacenters and multiple physical datacenters and may include one or more resources in a cloud computing environment. Resource pool 130A includes physical computing machine 140 executing VM (virtual machine) 142 and physical computing machine 150 executing VMs 152 and 154. Resource pool 130B includes physical computing machine 170 executing VM 172 and physical computing machine 180 executing VM 182. Resource pool 130C includes physical computing machines 150 and 170.

Each of the physical computing machines may be coupled to a network 190. A physical computing machine may be coupled to another physical computing machine in the same or different datacenter. In an example, physical computing machine 140 in physical datacenter 110A is coupled over network 190 to physical computing machine 170 in physical datacenter 110B, and physical computing machines 140 and 170 communicate with each other over network 190.

Network 190 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Each virtual datacenter may be associated with a cloud consumer's account. As cloud deployments increase, more data is maintained and it may become difficult to locate particular resources in the cloud computing environment. For example, if virtual datacenter 120 includes resources from twenty physical datacenters, it may become difficult to keep track of which resources in the twenty physical datacenters belong to virtual datacenter 120 and which resources in the twenty physical datacenters belong to a different virtual datacenter. It may be advantageous to organize the data associated with the cloud and physical resources so that the resources may be found quickly and efficiently.

Further, representation of the same attributes across different clouds may be expressed by different application programming interfaces (APIs). For example, if a user interacts with different clouds and desires to retrieve information on all virtual machines that are named "this_vm," API calls may be made to each of the individual clouds.

For example, to retrieve information about "this_vm," a user may make the following three API calls:

Public Cloud: result1=Public.cloud.api.getallVMsbyName("this_vm")

Private Cloud: result2=Cloud.api.getVms("name", "this_vm")

Hybrid Cloud: result3=some.other.Cloud.api.getVms ("name", "this_vm")
myVms=result1+result3

It may be advantageous to provide information about "this_vm" via one API call. In an example, the following API call may be made: allVms=getAllVmsByName ("this_vm"), and the API call returns (result1+result2+myVms).

Accordingly, rather than invoke multiple API calls to retrieve information about cloud and/or physical resources across different cloud deployments, a single API call may be invoked to retrieve this information. To provide quick access to cloud and physical resources across different clouds, it may be advantageous to index these resources and make them accessible via one unified, normalized system. In an example, if a resource (e.g., VM) is executing in a cloud, the resource may have standard attributes (e.g., power state, memory size, and/or hard disk size). The present disclosure provides techniques to store resource information and index the information to enable fast retrieval. Additionally, a single API call may be used to retrieve the resource information.

An embodiment may provide an advantage of fast access to any resource if any of the attributes is known. Resources across different cloud deployments may be indexed, and the resource information may be aggregated in an index optimized for searching.

II. Example System Architecture

In an embodiment, attributes of physical resources and cloud resources across a plurality of cloud deployments are indexed.

Figure 2:
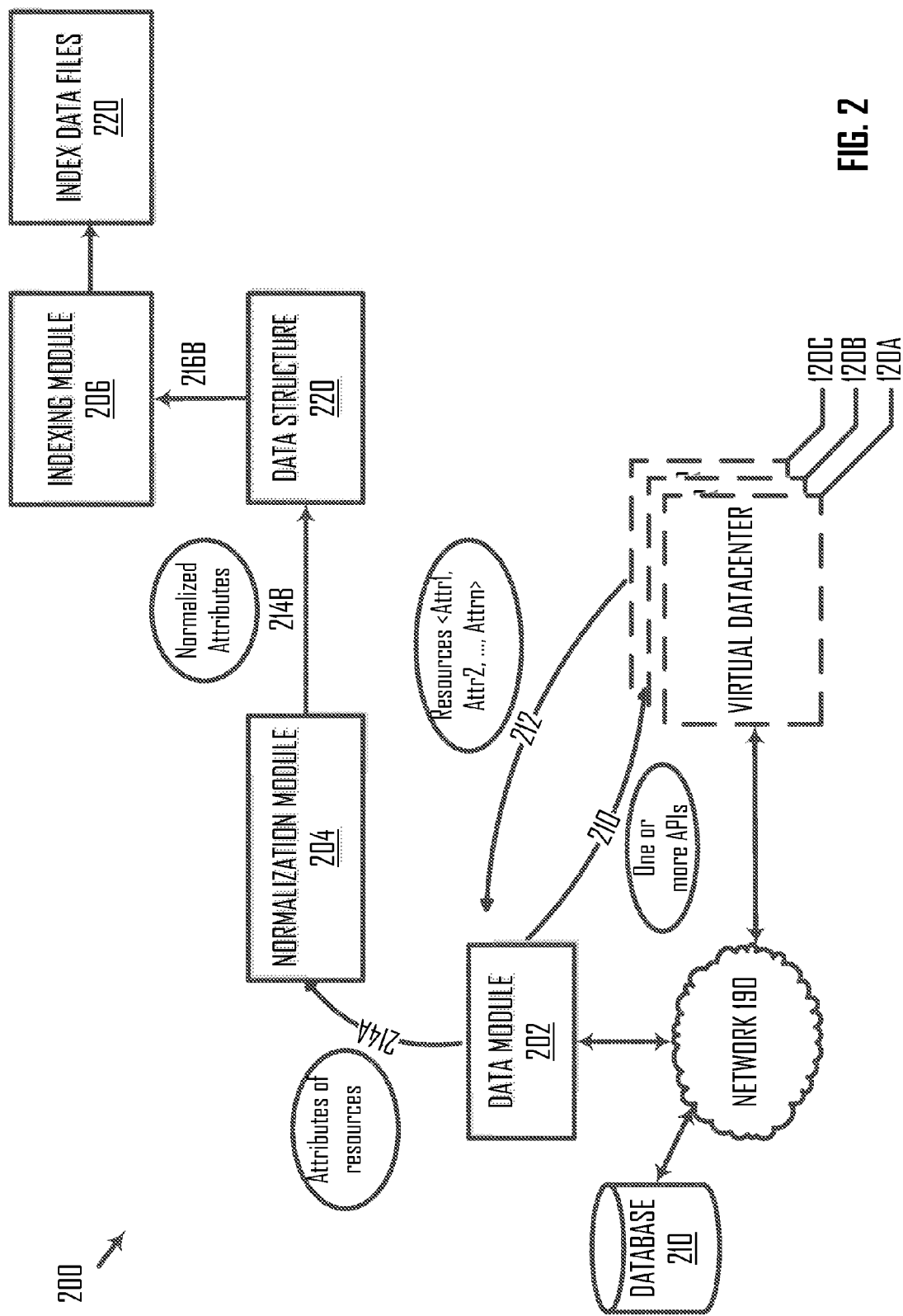
FIG. 2 is a simplified block diagram illustrating an indexing system for indexing heterogeneous resources, according to an embodiment.

Referring now to FIG. 2, an embodiment of an indexing system 200 for indexing heterogeneous resources is illustrated. Heterogeneous resources may refer to resources that are executable in different clouds. Further, resources that are different from each other may be heterogeneous resources.

System 200 includes a data module 202, normalization module 204, and indexing module 206 that may execute on one or more servers. A server of the one or more servers may be a physical server or a virtual server and may be coupled to network 190 through a physical network interface (not shown). In an example, data module 202, normalization module 204, and/or indexing module 206 is executed in a physical computing machine. In another example, data module 202, normalization module 204, and/or indexing module 206 is executed in a virtual machine (e.g., VM 142). In another example, data module 202, normalization module 204, and/or indexing module 206 is executed in a computing device that is not located in physical datacenters 110A and 110B.

A. Cloud Resources

The following is a description of cloud resources and indexing attributes of cloud resources. This description applies as well to physical resources and indexing attributes of physical resources.

System 200 also includes a database 208 that includes a set of mappings from an attribute of a cloud resource specific to a cloud to a normalized attribute based on a uniform schema. The one or more servers may be coupled to database 208 and configured to execute computer program modules, such as data module 202, normalization module 204, and indexing module 206.

In an embodiment, data module 202 identifies a set of cloud resources in a plurality of virtual datacenters 120A-120C. Data module 202 may identify the set of cloud resources in a variety of ways. In an example, data module 202 identifies the set of cloud resources by scanning virtual datacenters 120A-120C. In another example, data module 202 retrieves from virtual datacenters 120A-120C one or more cloud resources of the set of cloud resources. In this example, virtual datacenters 120A-120C may push the data to data module 202.

The plurality of virtual datacenters may include resources across different clouds. Data module 202 may identify the plurality of virtual datacenters and the set of cloud resources in the plurality of virtual datacenters. In an example, data module 202 identifies the plurality of virtual datacenters by retrieving a list including the plurality of virtual datacenters and processing the list by identifying the virtual datacenters in the list. In an example, the list may be a stored list of cloud installations.

The set of cloud resources may include cloud resources executable in different clouds. As illustrated by arrow 210, data module 202 may invoke one or more application programming interfaces (APIs). An API may represent a specific operation that data module 202 can invoke at runtime to perform tasks. The API may, for example, query data in a database (e.g., a database associated with virtual datacenters 120A-120C), modify data in the database (e.g., add, update, or delete data), or obtain metadata about the data in the database.

Responsive to the one or more invoked APIs, data module 202 may receive the cloud resources and attributes of the cloud resources, as illustrated by arrow 212. In an example, data module 202 receives over network 190 a response that includes the cloud resources and their attributes. For each cloud resource of the set of cloud resources, data module 202 may identify one or more attributes of the respective cloud resource. In an example, a cloud resource is a virtual machine (VM), and example attributes are a power state, Internet Protocol (IP) address, Media Access Control (MAC) address, and VM identifier of the VM. This is not intended to be limiting, and other attributes may be used.

Data module 202 may receive a first set of attributes of one or more cloud resources of a first subset of the set of cloud resources and a second set of attributes of one or more cloud resources of a second subset of the set of cloud resources. The first subset of cloud resources may be executable in a first cloud, and the second subset of cloud resources may be executable in a second cloud. In an example, the first subset of cloud resources includes a VM that is executable in the first cloud, and the second subset of cloud resources includes a VM that is executable in the second cloud.

The second cloud may be different from the first cloud. The first cloud may be a private cloud, public cloud, or hybrid cloud. Additionally, the first cloud may be a private cloud, public cloud, or hybrid cloud.

In an embodiment, the one or more invoked APIs that is used to receive cloud resource attributes includes multiple APIs. For example, the multiple APIs may include a first API and a second API different from the first API. Responsive to the first invoked API data module 202 may receive the first set of cloud resource attributes, and responsive to the second invoked API data module 202 may receive the second set of cloud resource attributes. In another embodiment, the one or more APIs is a single API. The single API may include programming code that invokes multiple APIs across different cloud deployments.

Further, the first set of cloud resource attributes may be compatible with the first cloud and incompatible with the second cloud, and the second set of cloud resource attributes may be compatible with the second cloud and incompatible with the first cloud. In an example, referring to the "power state" attribute of a VM, an attribute corresponding to "power state" that is compatible with the first cloud may be "stateofpower," and an attribute corresponding to "power state" that is compatible with the second cloud may be "pwrstate." The attribute "stateofpower," however, may be incompatible with the second cloud, and thus not recognizable by the second cloud. Similarly, the attribute "pwrstate" may be incompatible with the first cloud, and thus not recognizable by the first cloud.

B. Normalize the Attributes

In an embodiment, for at least one attribute of the first and second sets of attributes, normalization module 204 searches database 210 for a normalized attribute corresponding to the respective attribute. Normalization module 204 may search database 210 for the normalized attribute by executing a query against database 210 to find an entry including the respective attribute. After identifying the entry, normalization module 204 may determine the normalized attribute that is mapped from the respective attribute in the entry.

The uniform schema may enable attributes that have the same meaning but different representations in different cloud deployments to be accessed and indexed. Normalization module 204 may normalize results by using standard attribute names. In an example, database 210 includes mappings of specific attribute names used by cloud providers. In this way, the attributes across different cloud deployments may be easily accessible and incompatible with different clouds.

Normalization module 204 may normalize based on the uniform schema the respective attribute. In an embodiment, normalization module 204 normalizes the respective attribute by replacing it with the normalized attribute. In keeping with the above example, the normalized attribute of a power state of a VM may be "power_state." Database 210 may store a mapping from attribute "stateofpower" (compatible with the first cloud) to "power_state" (compatible with the first and second clouds) based on the uniform schema. Database 210 may also store a mapping from attribute "pwrstate" (compatible with the second cloud) to "power_state" (compatible with the first and second clouds) based on the uniform schema.

As illustrated by arrows 214A and 214B, normalization module 204 may then place the one or more normalized attributes in a data structure 220. Normalization module 204 may place the normalized attributes in data structure 220 by inserting the normalized attributes into data structure 220. The VM may have the normalized attribute "power_state" to describe the VM's power state. In an example, for a first VM running in the first cloud, normalization module 204 may place "power_state" (rather than "stateofpower") in the data structure as being the power state attribute that describes the first VM. Similarly, for a second VM running in the second cloud, normalization module 204 may place "power_state" (rather than "pwrstate") in the data structure as being the power state attribute that describes the second VM.

Data structure 220 may be a construct that is stored and indexed by indexing module 206. Normalization module 204 may dynamically create data structure 220 based on the one or more normalized attributes. Data structure 202 may be, for example, a JavaScript Object Notation (JSON) formatted document, and normalization module 204 may place the one or more normalized attributes in the JSON formatted document.

FIGS. 3A and 3B illustrate a JSON formatted document 300, 302 for a virtual machine, according to an embodiment. Document 300, 302 includes attributes and values corresponding to the attributes. Document 300, 302 includes one or more virtual attributes (e.g., isClone, parent, parentId, and toolStatus), one or more physical attributes (e.g., location, datacenter, and available space), and one or more attributes that are virtual and/or physical (e.g., datastores, diskInfo, and network). Whether the attribute is virtual or physical may depend on the individual cloud setup. In the case of a nested virtualization, all attributes may be virtual.

As shown in box 306, the virtual machine has an attribute "name" that identities the attribute. The value of the VM's "name" attribute is "435534-417834-linrepl.repl.com." To find the asset named "435534-417834-linrepl.repl.com," resource retrieval 530 may call a restful endpoint with "435534" as a parameter. Responsive to the call, resource retrieval 530 may receive documents 300, 302 with the cloud resource including the VM named "435534-417834-linrepl.repl.com." The VM's name may be indexed such that each VM having a name that includes "435534" may be returned.

Document 300, 302 is merely an example, and another VM may have different, additional, or fewer attributes and attribute values than that shown in document 300, 302. For example, the VM having the attributes listed in document 300 does not have an attribute representing mountPoints. Another VM may have mountPoints, and the data structure storing the attributes of this VM may include a value for the mountPoints attribute. Additionally, a different VM may have multiple disks, multiple datastores (the VM having the attributes listed in document 300 has only one), or not have any at all.

C. Physical Resources

In an embodiment, database 210 includes a set of mappings from an attribute of a physical resource specific to a cloud to a normalized attribute based on the uniform schema. Data module 202 may identify a set of physical resources in plurality of virtual datacenters 120A-120C and invoke one or more APIs. Responsive to the one or more invoked APIs, data module 202 may receive over network 190 a response that includes the physical resources and their attributes.

For each physical resource of the set of physical resources, data module 202 may identify one or more attributes of the respective physical resource. In an example, a physical resource is a physical computing device, and example attributes are a location, Internet Protocol (IP) address, Media Access Control (MAC) address, and identifier of the physical computing device. This is not intended to be limiting, and other attributes may be used.

Data module 202 may receive a first set of attributes of one or more physical resources of a first subset of the set of physical resources and a second set of attributes of one or more physical resources of a second subset of the set of physical resources. The first subset of physical resources may be executable in the first cloud, and the second subset of physical resources may be executable in the second cloud. In an example, the first subset of physical resources includes a hypervisor that is executable in the first cloud, and the second subset of physical resources includes a hypervisor that is executable in the second cloud.

In an embodiment, the one or more invoked APIs that is used to receive physical resource attributes includes multiple APIs. For example, the multiple APIs may include a first API and a second API different from the first API. Responsive to the first invoked API data module 202 may receive the first set of physical resource attributes, and responsive to the second invoked API data module 202 may receive the second set of physical resource attributes. In another embodiment, the one or more APIs is a single API that when invoked, causes data module 202 to receive physical resource attributes. Further, the first set of physical resource attributes may be compatible with the first cloud and incompatible with the second cloud, and the second set of physical resource attributes may be compatible with the second cloud and incompatible with the first cloud.

For at least one attribute of the first and second sets of physical resource attributes, normalization module 204 may search database 210 for a normalized attribute corresponding to the respective attribute, normalize based on the uniform schema the respective attribute, and place the normalized respective attribute in data structure 220.

D. Index the Attributes

Referring back to FIG. 2, indexing module 206 may index the one or more normalized attributes in data structure 220. In an example, indexing module 206 indexes attributes of cloud and/or physical resources across at least two different cloud deployments (e.g., private cloud, public cloud, and/or hybrid cloud).

In an embodiment, indexing module 206 indexes the normalized attributes in the data structure. The normalized attributes may include cloud and/or physical resources. Indexing module 206 may execute in accordance with a schedule or execute based on a user's input request for indexing module 206 to index resources. Indexing module 206 may output the indexed attributes to index data files 220. Index data files 220 may include a plurality of indexes that correspond to the indexed attributes. In an example, indexing module 206 indexes each of the normalized attributes in data structure 220.

Figure 4:
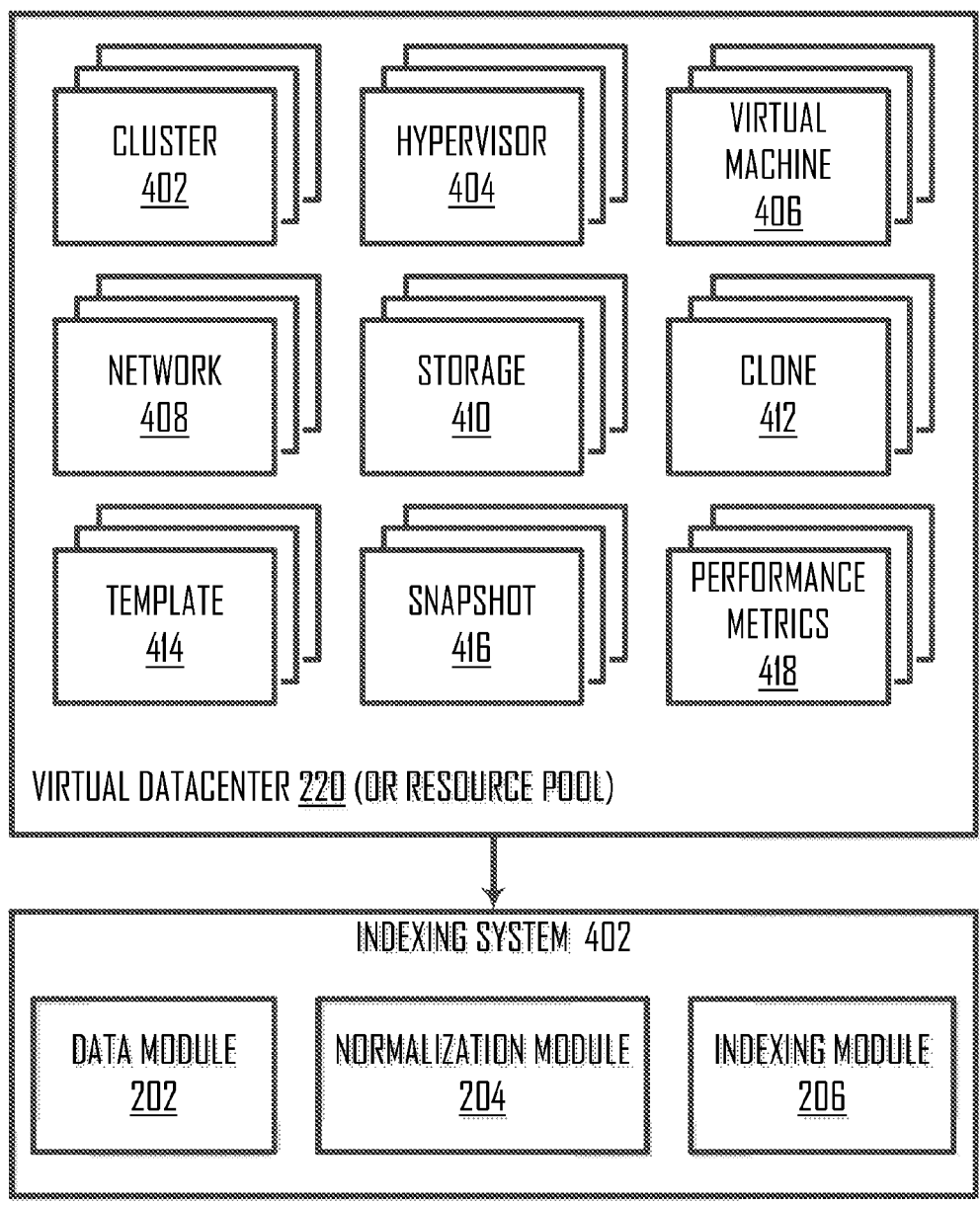
FIG. 4 is a simplified block diagram illustrating resource inputs into the indexing system, according to an embodiment.

FIG. 4 is a simplified block diagram 400 illustrating resource inputs into indexing system 402, according to an embodiment. Indexing system 402 may be a computing device that includes data module 202, normalization module 204, and indexing module 206.

Diagram 400 includes virtual data center 120 including a resource pool that includes one or more clusters 402, hypervisors 404, virtual machines 406, networks 408, storage 410, clones 412, templates 414, snapshots 416, and performance metrics 418. This is not intended to be limiting, and other resources may be used. Each of these resources may be used by indexing system 402 for indexing.

Indexing module 206 may be a commercially available or open source indexing engine that indexes the attributes in data structure 220. In an example, indexing module 206 is the LUCENE® indexing engine and outputs the indexes to LUCENE® data files. The indexes may be based on one or more attributes of a cloud and/or physical resource. Index data files 220 may be accessible via a search API. Indexing module 206 may receive requests for information about one or more resources, and indexing module 206 may search index data files 220 for the applicable information and provide the information to a user.

In an embodiment, the output is presented in the same format as the input format. For example, if indexing module 206 indexes attributes that are placed in a JSON document, indexing module 206 may provide a JSON document including the indexed attributes as output.

E. Update the Attributes

Due to the nature of cloud computing, the resources associated with a client may continuously expand and contract. To keep the attribute data up to date, data module 202 may update the attribute values. In an example, data module 202 determines an expected change frequency of a value of an attribute of the identified one or more attributes. For instance, an attribute such as physical disk capacity may not be expected to change very often whereas an attribute such as the power on state of a virtual machine may be expected to change often.

Data module 202 may assign a time-to-(TTL) live to the attribute, where the TTL is based on the expected change frequency. The TTL of the physical disk capacity attribute may be 30 minutes, and the TTL of the power on state of the virtual machine may be 5 minutes. Data module 202 may identify a first value of the attribute. After the TTL has expired, data module 202 may identify a second value of the attribute and determine whether the first value is the same as the second value. When the first value is determined to not be the same as the second value, data module 202 may update the first value with the second value. When the first value is determined to be the same as the second value, data module 202 may leave the attribute value as is. When the TTL expires, data module 202 may reset the timer to detect when the TTL expires again.

III. Different Cloud Deployments

The resources may execute in a cloud. A cloud may be a private cloud, public cloud, or hybrid cloud. Resources executing in different clouds may be indexed by indexing module 206. In an example, a first cloud resource of the set of cloud resources is executing in a first cloud, and a second cloud resource of the set of cloud resources is executing in a second cloud different from the first cloud.

Figure 5:
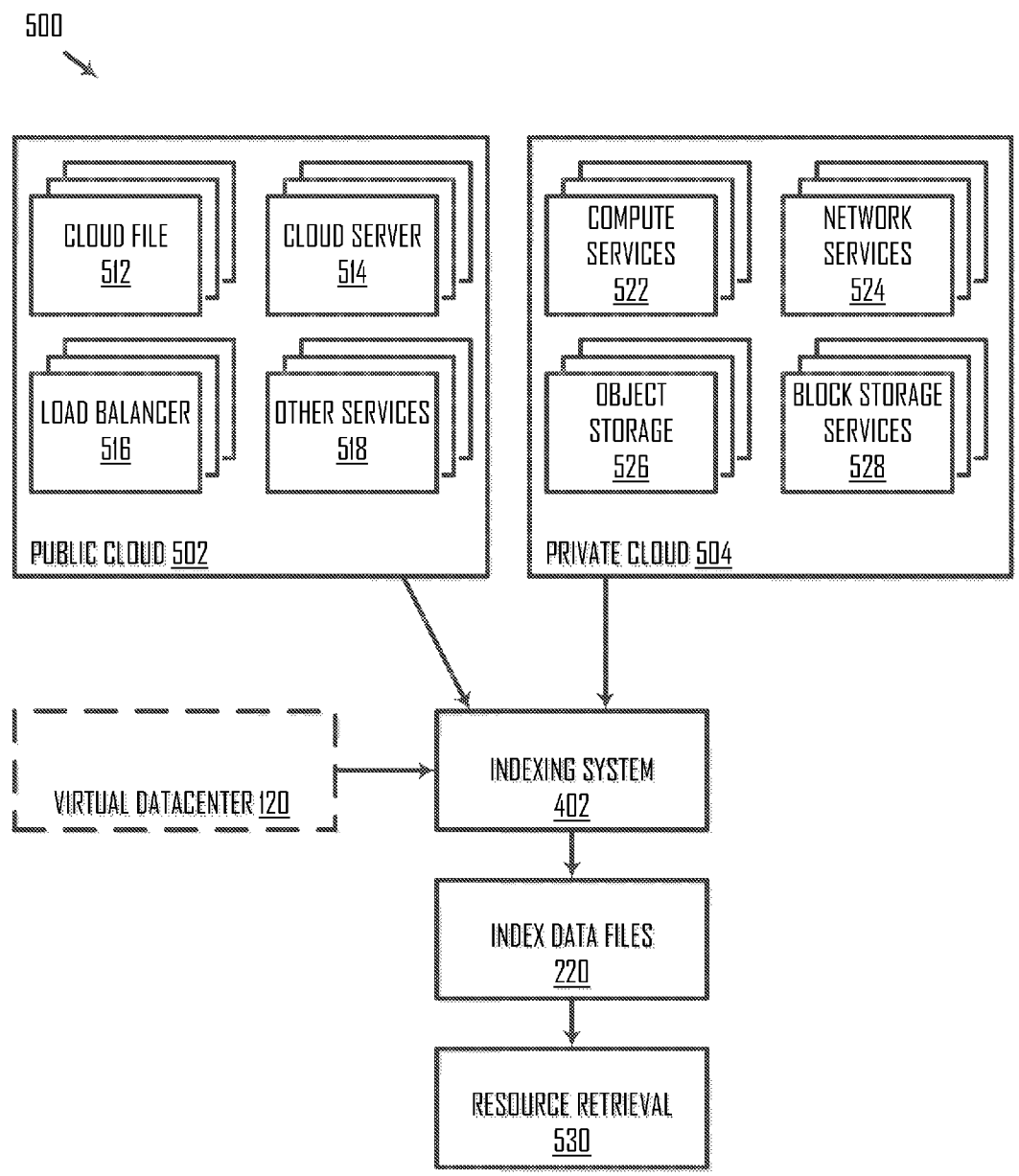
FIG. 5 is a simplified block diagram illustrating heterogeneous resources being input into the indexing system, according to an embodiment.

FIG. 5 is a simplified block diagram 500 illustrating resources from different clouds being input into the indexing system, according to an embodiment. Diagram 500 includes a public cloud 502, private cloud 504, and virtual datacenter 220. Public cloud 502 includes one or more cloud files 512, cloud servers 512, load balancers 516, and other services 518. Private cloud 504 includes compute services 522, network services 524, object storage 526, and block storage servers 528. This is not intended to be limiting, and in another embodiment, a public cloud and/or private cloud may include more or fewer components. Attributes associated with the resources in public cloud 502, private cloud 504, and virtual datacenter 220 may be used as input into indexing system 402 and indexed for quick retrieval of resource information. Indexing system 402 may output index data files 220 that index the attributes so that a resource retrieval 530 is easily searchable.

As discussed above and further emphasized here, FIGS. 1-5 are merely examples, which should not unduly limit the scope of the claims. For example, it should be understood that one or more components in FIG. 2 (e.g., data module 202, normalization module 204, and indexing module 206) may be combined into a single component. It should also be understood that one or more components in FIG. 2 (e.g., data module 202, normalization module 204, and indexing module 206) may be separated into more than one module. In an example, data module 202 is split into a first data module that receives attributes of cloud resources and a second data module that receives attributes of physical resources (not shown).

IV. Example Methods

Figure 6:
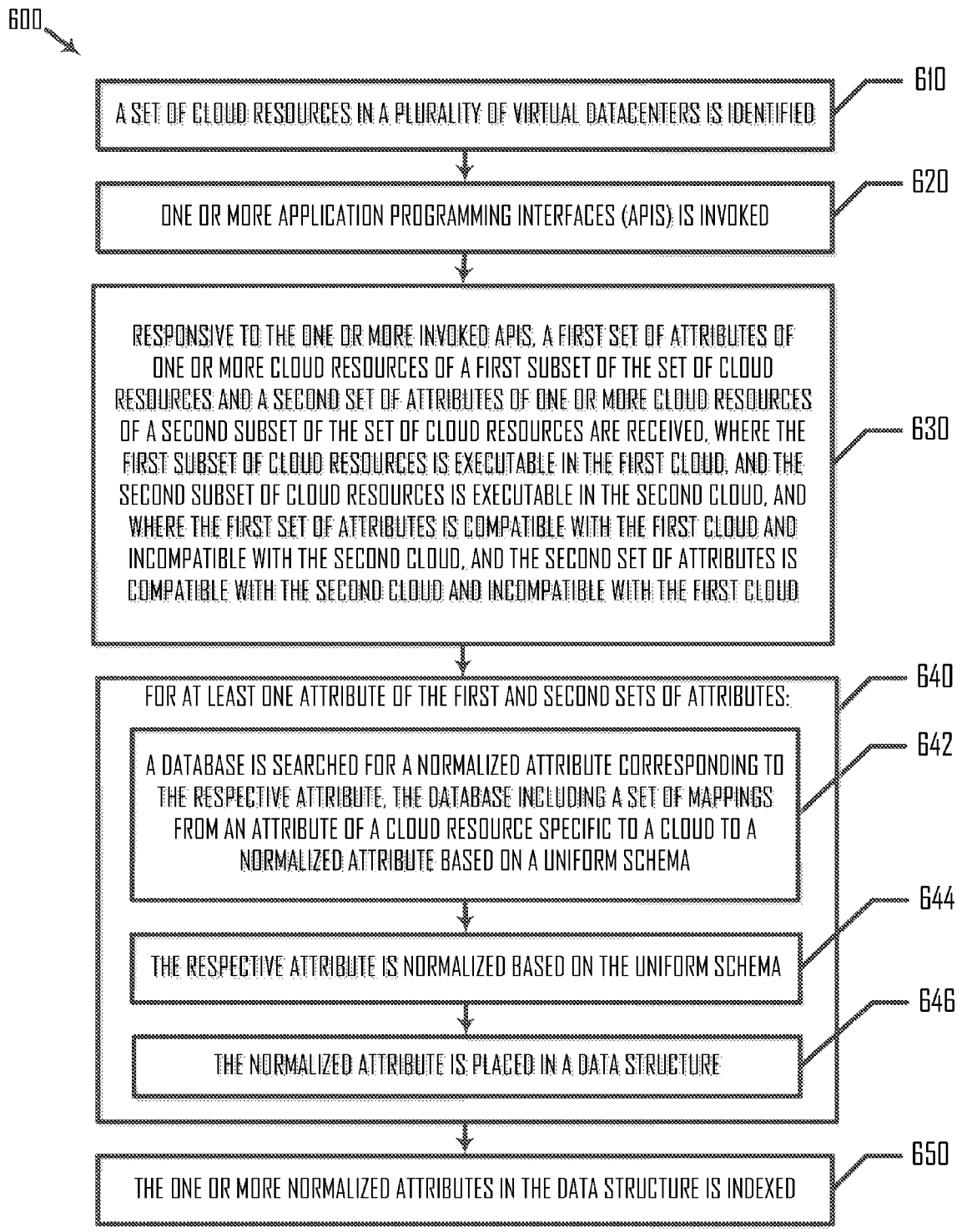
FIG. 6 is a flow chart showing a method of indexing heterogeneous resources, according to an embodiment.

FIG. 6 is a flow chart showing a method 600 of indexing heterogeneous resources, according to an embodiment. Method 600 is not meant to be limiting and may be used in other applications.

Method 600 includes steps 610-650. In a step 610, a set of cloud resources in a plurality of virtual datacenters is identified. In an example, data module 202 identifies a set of cloud resources in a plurality of virtual datacenters. In a step 620, one or more application programming interfaces (APIs) is invoked. In an example, data module 202 invokes one or more APIs.

In a step 630, responsive to the one or more invoked APIs, a first set of attributes of one or more cloud resources of a first subset of the set of cloud resources and a second set of attributes of one or more cloud resources of a second subset of the set of cloud resources are received, where the first subset of cloud resources is executable in the first cloud, and the second subset of cloud resources is executable in the second cloud, and where the first set of attributes is compatible with the first cloud and incompatible with the second cloud, and the second set of attributes is compatible with the second cloud and incompatible with the first cloud. In an example, responsive to the one or more invoked APIs, data module 202 receives a first set of attributes of one or more cloud resources of a first subset of the set of cloud resources and a second set of attributes of one or more cloud resources of a second subset of the set of cloud resources, where the first subset of cloud resources is executable in the first cloud, and the second subset of cloud resources is executable in the second cloud, and where the first set of attributes is compatible with the first cloud and incompatible with the second cloud, and the second set of attributes is compatible with the second cloud and incompatible with the first cloud.

In a step 640, for at least one attribute of the first and second sets of attributes, steps 642-646 are performed. In a step 642, a database is searched for a normalized attribute corresponding to the respective attribute, the database including a set of mappings from an attribute of a cloud resource specific to a cloud to a normalized attribute based on a uniform schema. In an example, normalization module 204 searches database 210 for a normalized attribute corresponding to the respective attribute, where database 210 includes a set of mappings from an attribute of a cloud resource specific to a cloud to a normalized attribute based on a uniform schema. In a step 646, the respective attribute is normalized based on the uniform schema. In an example, normalization module 204 normalizes based on the uniform schema the respective attribute. In a step 646, the normalized attribute is placed in a data structure. In an example, normalization module 204 places the normalized attribute in data structure 220. In a step 650, the one or more normalized attributes in the data structure is indexed. In an example, indexing module 206 indexes the one or more normalized attributes in data structure 220.

It is also understood that additional method steps may be performed before, during, or after steps 610-650 discussed above. It is also understood that one or more of the steps of method 600 described herein may be omitted, combined, or performed in a different sequence as desired.

Figure 7:
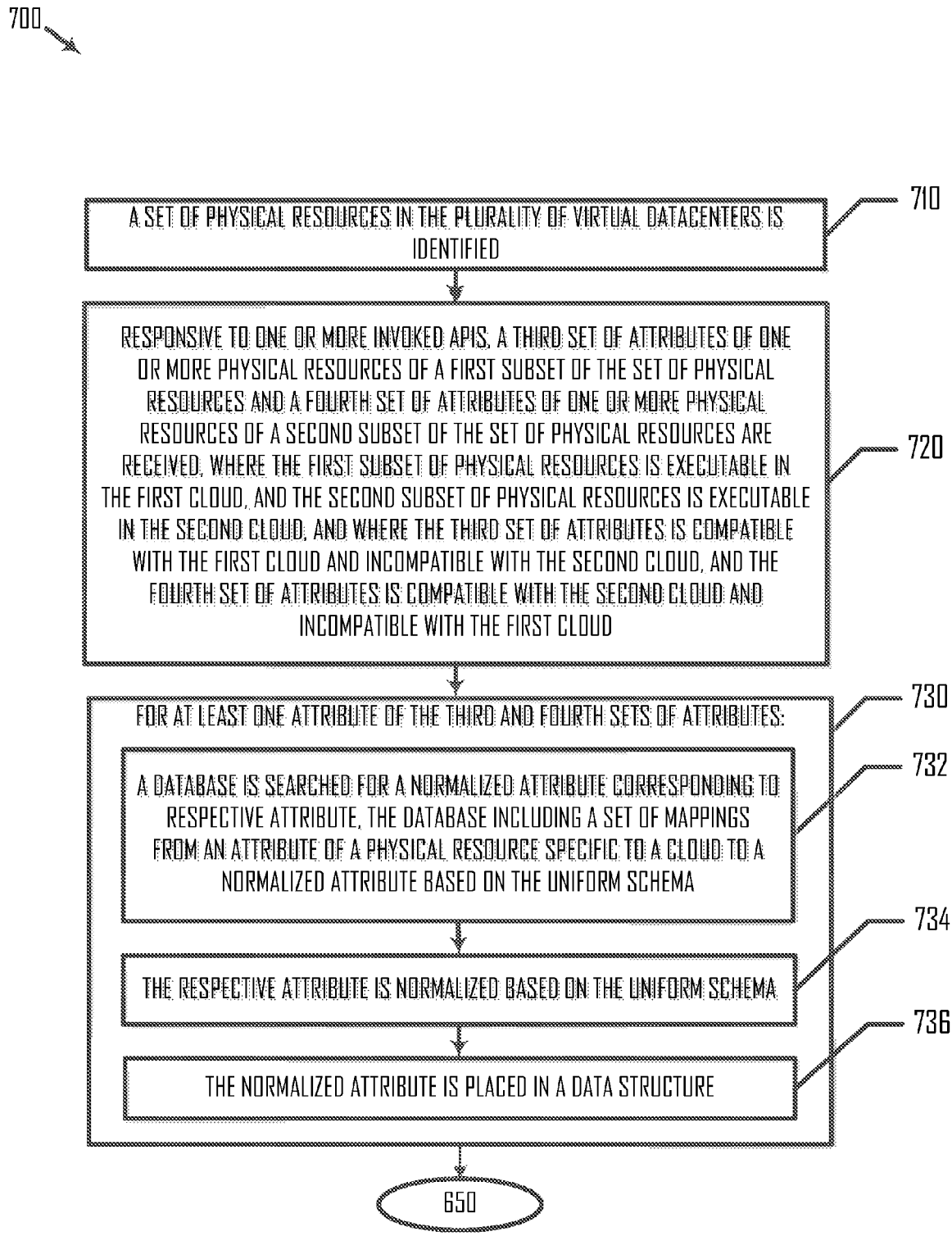
FIG. 7 is a flow chart showing a method of indexing heterogeneous resources, according to an embodiment.

FIG. 7 is a flow chart showing a method 700 of indexing heterogeneous resources, according to an embodiment. Method 700 is not meant to be limiting and may be used in other applications.

Method 700 includes steps 710-736. In a step 710, a set of physical resources in the plurality of virtual datacenters is identified. In an example, data module 202 identifies a set of physical resources in the plurality of virtual datacenters.

In a step 720, responsive to one or more invoked APIs, a third set of attributes of one or more physical resources of a first subset of the set of physical resources and a fourth set of attributes of one or more physical resources of a second subset of the set of physical resources are received, where the first subset of physical resources is executable in the first cloud, and the second subset of physical resources is executable in the second cloud, and where the third set of attributes is compatible with the first cloud and incompatible with the second cloud, and the fourth set of attributes is compatible with the second cloud and incompatible with the first cloud. In an example, responsive to one or more invoked APIs, data module 220 receives a third set of attributes of one or more physical resources of a first subset of the set of physical resources and a fourth set of attributes of one or more physical resources of a second subset of the set of physical resources, where the first subset of physical resources is executable in the first cloud, and the second subset of physical resources is executable in the second cloud, and where the third set of attributes is compatible with the first cloud and incompatible with the second cloud, and the fourth set of attributes is compatible with the second cloud and incompatible with the first cloud.

In a step 730, for at least one attribute of the third and fourth sets of attributes, steps 732-736 are performed. In a step 732, a database is searched for a normalized attribute corresponding to the respective attribute, the database including a set of mappings from an attribute of a physical resource specific to a cloud to a normalized attribute based on the uniform schema. In an example, normalization module 204 searches database 210 for a normalized attribute corresponding to the respective attribute, where database 210 includes a set of mappings from an attribute of a physical resource specific to a cloud to a normalized attribute based on the uniform schema. In a step 732, the respective attribute is normalized based on the uniform schema. In an example, normalization module 204 normalizes based on the uniform schema the respective attribute. In a step 736, the normalized attribute is placed in a data structure. In an example, normalization module 204 places the normalized attribute in data structure 220. Process flow may continue to step 650 in FIG. 6, where the one or more normalized attributes in the data structure is indexed.

It is also understood that additional method steps may be performed before, during, or after steps 710-736 discussed above. It is also understood that one or more of the steps of method 700 described herein may be omitted, combined, or performed in a different sequence as desired.

Further, it is also understood that method 600 may be performed before, after, or during method 700. Further, method 700 may be performed without performing method 600. Similarly, method 600 may be performed without performing method 700.

V. Example Computing System

Figure 8:
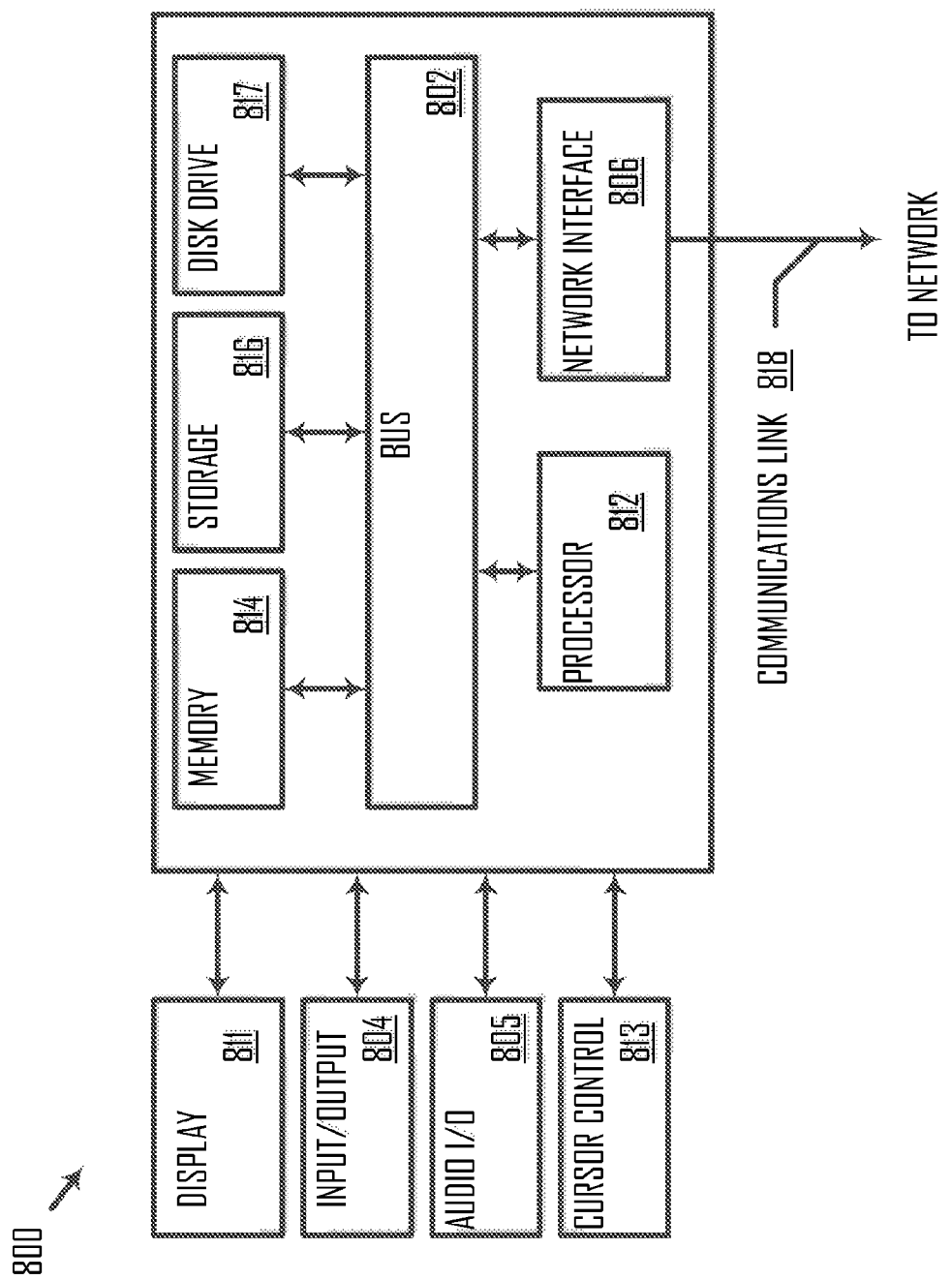
FIG. 8 is a block diagram of a computer system suitable for implementing one or more embodiments of the present disclosure.

FIG. 8 is a block diagram of a computer system 800 suitable for implementing one or more embodiments of the present disclosure. In various implementations, network controller 110 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 802. I/O component 804 may also include an output component such as a display 811, and an input control such as a cursor control 813 (such as a keyboard, keypad, mouse, etc.). An optional audio input/output component 805 may also be included to allow a user to use voice for inputting information by converting audio signals into information signals. Audio I/O component 805 may allow the user to hear audio. A transceiver or network interface 806 transmits and receives signals between computer system 800 and other devices via a communication link 818 to a network. In an embodiment, the transmission is wireless, although other transmission mediums and methods may also be suitable. A processor 812, which may be a microcontroller, digital signal processor (DSP), or other processing component, processes these various signals, such as for display on computer system 800 or transmission to other devices via communication link 818. Processor 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor 812 and other components by executing one or more sequences of instructions contained in system memory component 814. Logic may be encoded in a computer readable medium, which may refer to any medium that participates in providing instructions to processor 812 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 814, and transmission media includes coaxial cables, copper wire, and fiber optics, including wires that include bus 802. In an embodiment, the logic is encoded in non-transitory computer readable medium. In an example, transmission media may take the form of acoustic or light waves, such as those generated during radio wave, optical, and infrared data communications.

Some forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 100. In various other embodiments of the present disclosure, a plurality of computer systems 100 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. In an example, network controller 110 may be a software module executing in a server. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for indexing heterogeneous resources, the system comprising:
  a database including a set of mappings from an attribute name of a physical resource specific to a cloud to a normalized attribute name based on a uniform schema; and
  one or more processors coupled to the database and configured to execute computer program modules, the computer program modules comprising:
  a data module executable by the one or more processors, wherein the data module identifies a set of physical resources in a plurality of virtual datacenters, invokes a single application programming interface (API), wherein the invoked API causes invocation of a first API and a second API different from the first API, and wherein responsive to the invoked first API the data module receives a first set of attribute names, and responsive to the invoked second API the data module receives a second set of attribute names,
  wherein each virtual datacenter of the plurality of virtual datacenters is associated with a cloud consumer's account, and wherein a first virtual datacenter includes one or more physical resources located in a first physical data center and one or more physical resources located in a second physical data center, and a second virtual datacenter includes one or more physical resources located in the first physical data center and one or more physical resources located in a third physical data center,
  wherein a first subset of physical resources is executable in the first cloud, and a second subset of physical resources is executable in the second cloud, and
  wherein the first set of attribute names is compatible with the first cloud and incompatible with the second cloud, and the second set of attribute names is compatible with the second cloud and incompatible with the first cloud;
  a normalization module executable by the one or more processors, wherein for a first attribute name of the first set of attribute names, the normalization module searches the database for a first normalized attribute name corresponding to the first attribute name, normalizes based on the uniform schema the first attribute name, and places the normalized first attribute name in a data structure, wherein the first attribute name is different from the normalized first attribute name, wherein for a second attribute name of the second set of attribute names, the normalization module searches the database for a second normalized attribute name corresponding to the second attribute name, normalizes based on the uniform schema the second attribute name, and places the normalized second attribute name in the data structure, wherein the second attribute name is different from the normalized second attribute name; and an indexing module executable by the one or more processors, wherein the indexing module indexes the normalized first and second attribute names in the data structure and outputs the indexes to index data files, and the index data files are accessible via a search API.

2. The system of claim 1, wherein the database includes a second set of mappings from a second attribute name of a cloud resource specific to the cloud to a third normalized attribute name based on the uniform schema, wherein the data module identifies a set of cloud resources in the plurality of virtual datacenters, and responsive to the invoked APIs, receives a third set of attribute names of one or more cloud resources of a first subset of the set of cloud resources and a fourth set of attribute names of one or more cloud resources of a second subset of the set of cloud resources, wherein the first subset of cloud resources is executable in the first cloud, and the second subset of cloud resources is executable in the second cloud, and wherein the third set of attribute names is compatible with the first cloud and incompatible with the second cloud, and the fourth set of attribute names is compatible with the second cloud and incompatible with the first cloud; and wherein for at least one attribute name of the third and fourth sets of attribute names, the normalization module searches the database for the third normalized attribute name corresponding to the at least one attribute name, normalizes based on the uniform schema the at least one attribute name, and places the normalized at least one attribute name in the data structure.

3. The system of claim 2, wherein the first cloud is at least one of a private cloud, public cloud, and hybrid cloud.

4. A method of indexing heterogeneous resources, the system comprising:

identifying a set of physical resources in a plurality of virtual datacenters;

invoking a single application programming interface (API), wherein the invoked API causes invocation of a first API and a second API different from the first API;

responsive to the invoked first API, receiving a first set of attribute names of one or more physical resources of a first subset of the set of physical resources;

responsive to the invoked second API, receiving a second set of attribute names of one or more physical resources of a second subset of the set of physical resources;

wherein each virtual datacenter of the plurality of virtual datacenters is associated with a cloud consumer's account, and wherein a first virtual datacenter includes one or more physical resources located in a first physical data center and one or more physical resources located in a second physical data center, and a second virtual datacenter includes one or more physical resources located in the first physical data center and one or more physical resources located in a third physical data center, wherein the first subset of physical resources is executable in the first cloud, and the second subset of physical resources is executable in the second cloud, and wherein the first set of attribute names is compatible with the first cloud and incompatible with the second cloud, and the second set of attribute names is compatible with the second cloud and incompatible with the first cloud;

for a first attribute name of the first set of attribute names:

searching a database for a first normalized attribute name corresponding to the first attribute name, the database including a set of mappings from a particular attribute name of a physical resource specific to a cloud to a particular normalized attribute name based on a uniform schema;

normalizing based on the uniform schema the first attribute name; and placing the normalized first attribute name in a data structure, wherein the first attribute name is different from the normalized first attribute name; and for a second attribute name of the second set of attribute names:

searching the database for a second normalized attribute name corresponding to the second attribute name;

normalizing based on the uniform schema the second attribute name; and placing the normalized second attribute name in the data structure, wherein the second attribute name is different from the normalized second name;

indexing the normalized first and second attribute names in the data structure; and outputting the indexes to index data files, wherein the index data files are accessible via a search API.

5. The method of claim 4, further including:

identifying a set of cloud resources in the plurality of virtual datacenters;

responsive to the invoked single API, receiving a third set of attribute names of one or more cloud resources of a first subset of the set of cloud resources and a fourth set of attribute names of one or more cloud resources of a second subset of the set of cloud resources, wherein the first subset of cloud resources is executable in the first cloud, and the second subset of cloud resources is executable in the second cloud, and wherein the third set of attribute names is compatible with the first cloud and incompatible with the second cloud, and the fourth set of attribute names is compatible with the second cloud and incompatible with the first cloud; and for at least one attribute name of the third and fourth sets of attribute names:

searching the database for a normalized attribute name corresponding to the at least one attribute name, the database including a set of mappings from an attribute name of a cloud resource specific to a cloud to a normalized attribute name based on the uniform schema;

normalizing based on the uniform schema the at least one attribute name; and placing the normalized at least one attribute name in the data structure.

6. The method of claim 4, further comprising:

dynamically creating the data structure based on the at least one attribute name.

7. The method of claim 4, wherein the placing the normalized at least one attribute name in a data structure includes placing the normalized at least one attribute name in a JavaScript Object Notation (JSON) formatted document.

8. The method of claim 4, further comprising:
determining an expected change frequency of a value of a received attribute name;
assigning a time-to-live to the received attribute name, the time-to-live being based on the expected change frequency;
identifying a first value of the received attribute name;
after the time-to-live has expired, identifying a second value of the received attribute name;
determining whether the first value is the same as the second value; and
when the first value is determined to not be the same as the second value, updating the first value with the second value.

9. A non-transitory machine-readable medium comprising a first plurality of machine-readable instructions that when executed by one or more processors is adapted to cause the one or more processors to perform a method comprising:
identifying a set of physical resources in a plurality of virtual datacenters;
invoking a single application programming interface (API), wherein the invoked API causes invocation of a first API and a second API different from the first API;
responsive to the invoked first API, receiving a first set of attribute names of one or more physical resources of a first subset of the set of physical resources;
responsive to the invoked second API, receiving a second set of attribute names of one or more physical resources of a second subset of the set of physical resources,
wherein each virtual datacenter of the plurality of virtual datacenters is associated with a cloud consumer's account, and wherein a first virtual datacenter includes one or more physical resources located in a first physical data center and one or more physical resources located in a second physical data center, and a second virtual datacenter includes one or more physical resources located in the first physical data center and one or more physical resources located in a third physical data center,
wherein the first subset of physical resources is executable in the first cloud, and the second subset of physical resources is executable in the second cloud, and wherein the first set of attribute names is compatible with the first cloud and incompatible with the second cloud, and the second set of attribute names is compatible with the second cloud and incompatible with the first cloud;
for a first attribute name of the first set of attribute names:
searching a database for a first normalized attribute name corresponding to the first attribute name, the database including a set of mappings from an attribute name of a physical resource specific to a cloud to a normalized attribute name based on a uniform schema;
normalizing based on the uniform schema the first attribute name; and
placing the normalized first attribute name in a data structure, wherein the first attribute name is different from the normalized first attribute name; and
for a second attribute name of the second set of attribute names:
searching the database for a second normalized attribute name corresponding to the second attribute name;
normalizing based on the uniform schema the second attribute name; and
placing the normalized second attribute name in the data structure, wherein the second attribute name is different from the normalized second attribute name; and
indexing the normalized first and second attribute names in the data structure.

10. The non-transitory machine-readable medium of claim 9, the non-transitory machine-readable medium comprising a second plurality of machine-readable instructions that when executed by one or more processors is adapted to cause the one or more processors to perform a method comprising:
identifying a set of cloud resources in the plurality of virtual datacenters, wherein the set of cloud resources span the first and second virtual datacenters;
responsive to the invoked one or more APIs, receiving a third set of attribute names of one or more cloud resources of a first subset of the set of cloud resources and a fourth set of attribute names of one or more cloud resources of a second subset of the set of cloud resources,
wherein the first subset of cloud resources is executable in the first cloud, and the second subset of cloud resources is executable in the second cloud, and wherein the third set of attribute names is compatible with the first cloud and incompatible with the second cloud, and the fourth set of attribute names is compatible with the second cloud and incompatible with the first cloud; and
for at least one attribute name of the third and fourth sets of attribute names:
searching the database for a normalized attribute name corresponding to the at least one attribute name, the database including a set of mappings from an attribute name of a cloud resource specific to a cloud to a normalized attribute name based on the uniform schema;
normalizing based on the uniform schema the at least one attribute name; and
placing the normalized at least one attribute name in the data structure.

11. The system of claim 1, wherein the single API includes programming code that invokes multiple APIs across different cloud deployments.

12. The method of claim 4, wherein the plurality of virtual datacenters includes one or more physical resources located in a first physical data center and one or more physical resources located in a second physical data center.

13. The method of claim 4, wherein the single API includes programming code that invokes multiple APIs across different cloud deployments.

* * * * *